(12) United States Patent
Eshkoli et al.

(10) Patent No.: US 7,542,068 B2
(45) Date of Patent: Jun. 2, 2009

(54) METHOD AND SYSTEM FOR CONTROLLING MULTIMEDIA VIDEO COMMUNICATION

(75) Inventors: Noam Eshkoli, Tel-Mond (IL); Moshe Elbaz, Tel-Aviv (IL)

(73) Assignee: Polycom, Inc., Pleasanton, CA (US)

( * ) Notice: Subject to any disclaimer, the term of this patent is extended or adjusted under 35 U.S.C. 154(b) by 1089 days.

(21) Appl. No.: 10/346,306

(22) Filed: Jan. 16, 2003

(65) Prior Publication Data

US 2003/0174202 A1    Sep. 18, 2003

Related U.S. Application Data

(63) Continuation-in-part of application No. 09/952,339, filed on Sep. 14, 2001, now Pat. No. 6,757,005, which is a continuation-in-part of application No. 09/506,861, filed on Jan. 13, 2000, now Pat. No. 6,300,973, application No. 10/346,306, filed on Jan. 16, 2003.

(60) Provisional application No. 60/349,674, filed on Jan. 16, 2002, provisional application No. 60/351,255, filed on Jan. 22, 2002.

(51) Int. Cl.
  *H04N 7/14* (2006.01)
  *G06F 3/00* (2006.01)
(52) U.S. Cl. ............... 348/14.08; 348/14.09; 348/14.12
(58) Field of Classification Search ... 348/14.01–14.09, 348/14.1, 14.11, 14.12, 14.13, 14.16; 370/262, 370/261; 715/753, 755; 709/204
See application file for complete search history.

(56) References Cited

U.S. PATENT DOCUMENTS

| | | |
|---|---|---|
| 5,136,581 A | 8/1992 | Muehrcke |
| 5,408,274 A | 4/1995 | Chang |
| 5,453,780 A | 9/1995 | Chen |
| 5,515,099 A | 5/1996 | Cortjens et al. ............... 348/15 |
| 5,555,017 A | 9/1996 | Landante et al. |
| 5,563,882 A | 10/1996 | Bruno |
| 5,585,850 A | 12/1996 | Schwaller |
| 5,600,646 A | 2/1997 | Polomski |
| 5,680,392 A | 10/1997 | Semaan |
| 5,684,527 A | 11/1997 | Terui |
| 5,696,813 A * | 12/1997 | Sears et al. ............... 379/93.05 |
| 5,708,732 A | 1/1998 | Merhav |
| 5,745,161 A | 4/1998 | Ito |
| 5,751,338 A | 5/1998 | Ludwig, Jr. |

(Continued)

OTHER PUBLICATIONS

Supplementary European Search Report from counterpart European application dated Jun. 10, 2005 (Application No. EP 03 71 0697).

*Primary Examiner*—Melur Ramakrishnaiah
(74) *Attorney, Agent, or Firm*—Wong, Cabello, Lutsch, Rutherford, & Brucculeri, LLP

(57) ABSTRACT

In an embodiment, a videoconference system is provided in which a conference can be controlled by an end user (e.g., a participant of the conference) without the assistance of an operator. In another embodiment, the end user is presented with a graphical feature on an image associated with an ongoing conference that links to a menu, which in turn links to routines for selecting various options that change the setup of the conference. In yet another embodiment, the parameters of the conference can be changed while the conference is ongoing. In a further embodiment, the conference control unit includes a menu generator. Any combination of the above embodiments can be used together in one embodiment.

32 Claims, 10 Drawing Sheets

U.S. PATENT DOCUMENTS

| | | | |
|---|---|---|---|
| 5,793,415 A * | 8/1998 | Gregory et al. | 348/14.1 |
| 5,796,434 A | 8/1998 | Lempel | |
| 5,832,135 A | 11/1998 | Bhaskaran | |
| 5,862,329 A | 1/1999 | Aras | |
| 5,872,922 A | 2/1999 | Hogan | |
| 5,886,734 A | 3/1999 | Ozone | |
| 5,889,945 A * | 3/1999 | Porter et al. | 709/204 |
| 5,916,302 A * | 6/1999 | Dunn et al. | 709/204 |
| 5,951,637 A | 9/1999 | Kuzma | |
| 5,961,589 A | 10/1999 | Hansen | |
| 5,963,547 A | 10/1999 | O'Neil | |
| 5,995,490 A | 11/1999 | Shaffer | |
| 5,999,208 A | 12/1999 | McNerney et al. | 348/15 |
| 6,154,778 A | 11/2000 | Koistinen | |
| 6,201,859 B1 * | 3/2001 | Memhard et al. | 379/93.21 |
| 6,219,412 B1 | 4/2001 | Wellner | |
| 6,263,507 B1 * | 7/2001 | Ahmad et al. | 725/134 |
| 6,404,811 B1 * | 6/2002 | Cvetko et al. | 375/240.01 |
| 6,535,592 B1 | 3/2003 | Snelgrove | |
| 6,584,077 B1 * | 6/2003 | Polomski | 370/263 |

* cited by examiner

TO CHANGE SPEAKER PRESS 1.
TO ADD PARTICIPENT PRESS 2.
TO REMOVE PARTICIPENT PRESS 3.
TO CHANGE LAYOUT PRESS 4.
TO RETURNE TO STEADY STATE PRESS *.

| ADD PARTI. -> 1 | SPEAKER -> 2 |
| REMOVE -> 4 | LAYOUT -> 5 |
| BACK -> * | |

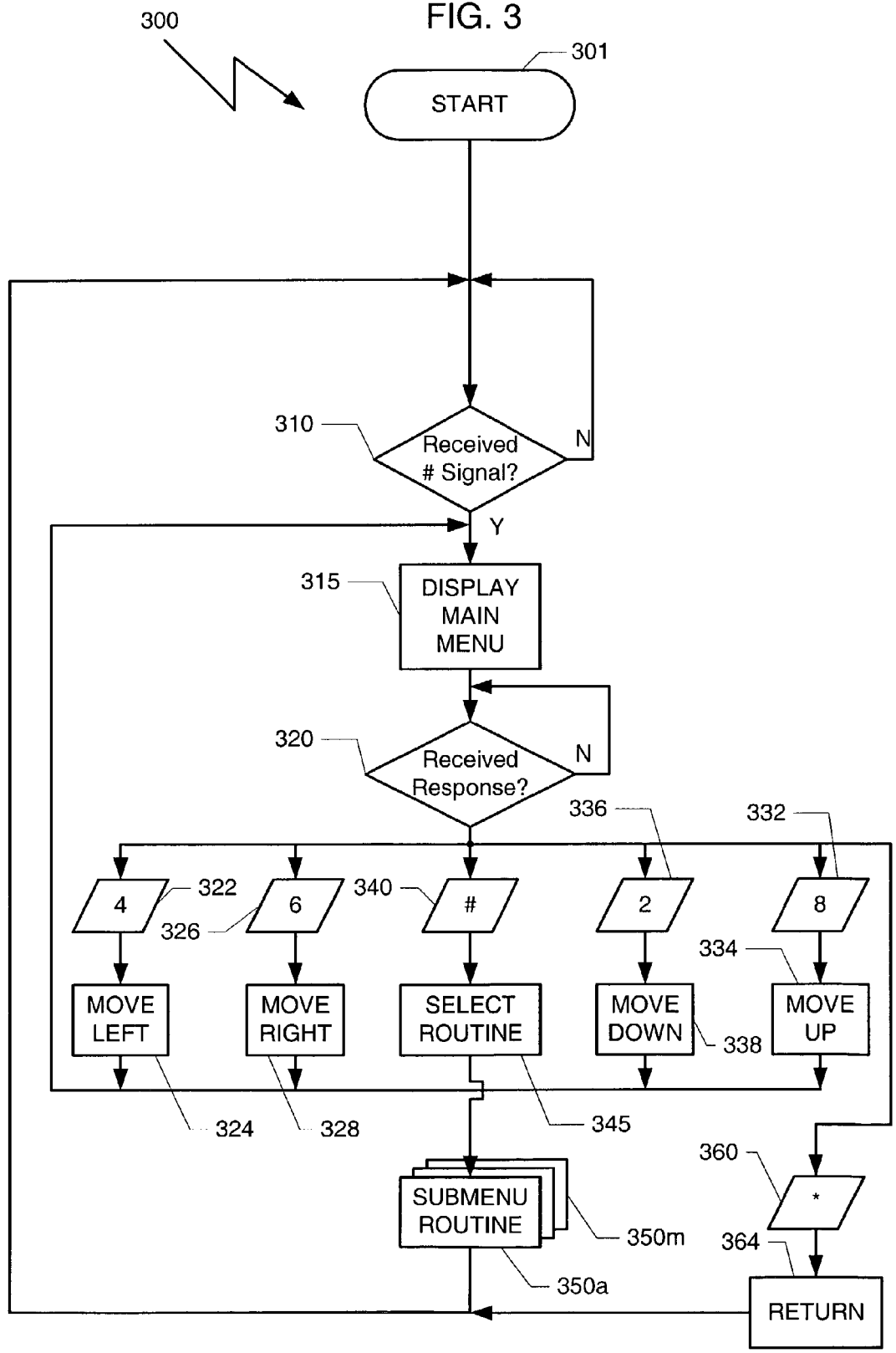

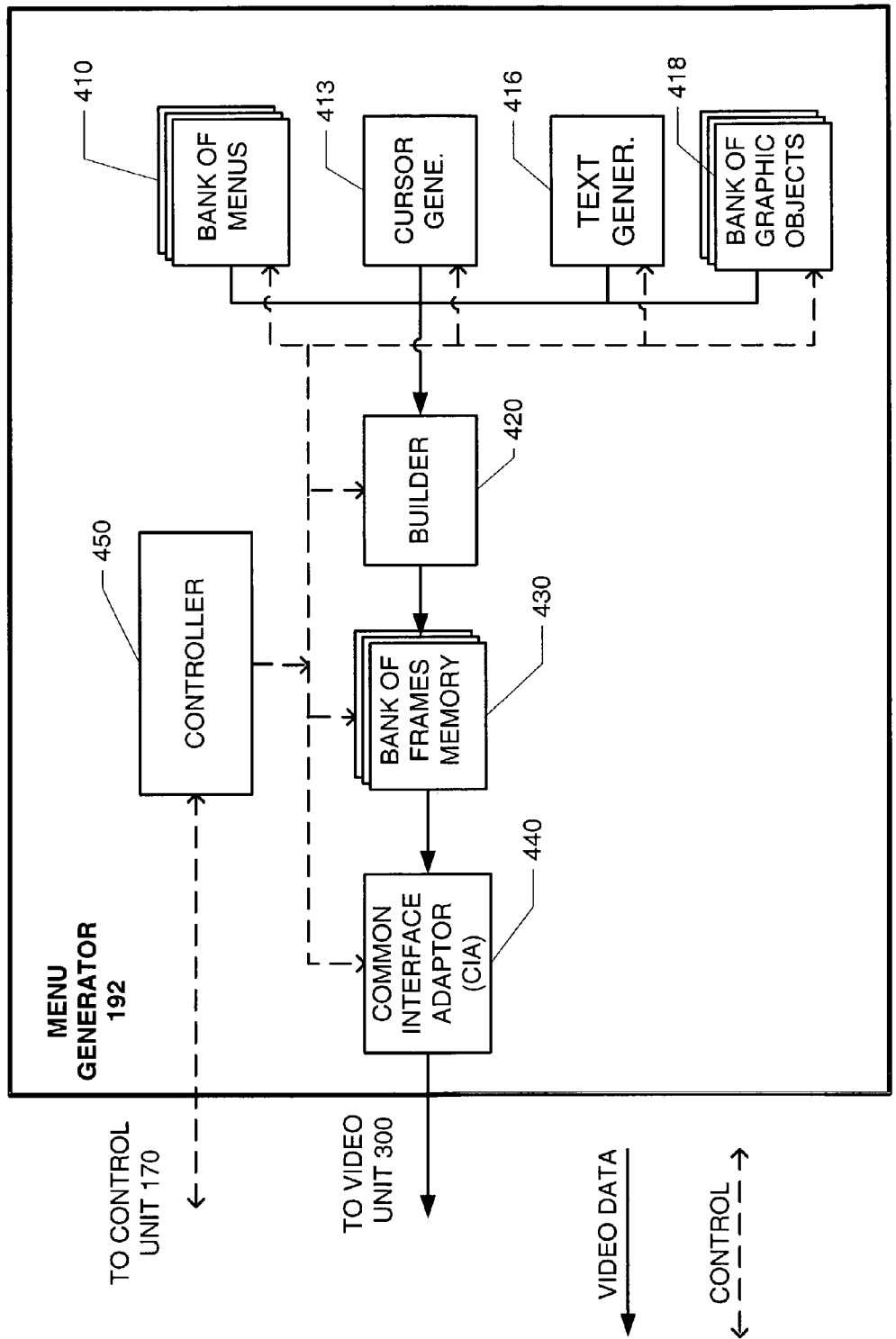

US 7,542,068 B2

METHOD AND SYSTEM FOR CONTROLLING MULTIMEDIA VIDEO COMMUNICATION

CROSS-REFERENCE TO RELATED APPLICATIONS

This application claims priority benefit of U.S. Provisional Patent Application Ser. No. 60/349,674, entitled "Method and System for Controlling Multimedia Video Communication," by Noam Eshkoli and Moshe Elbaz, filed Jan. 16, 2002 and U.S. Provisional Patent Application Ser. No. 60/351,255 having the same title and the same inventors, filed Jan. 22, 2002. The application is also a continuation-in-part of U.S. patent application Ser. No. 09/952,339, entitled "Method and System for Multimedia Video Processing," Moshe Elbaz, Noam Eshkoli, Ilan Yona, and Aviv Eisenberg, filed Sep. 14, 2001, now U.S. Pat. No. 6,757,005 which in turn is a continuation-in-part of U.S. patent application Ser. No. 09/506,861, now U.S. Pat. No. 6,300,973, entitled "Method and System for Multimedia Communication Control," by Meir Feder, Noam Eshkoli, Moshe Elbaz, Aviv Eisenberg, and Ilan Yona, filed Jan. 13, 2000. This application also claims priority benefit of PCT Application Number PCT/IL01/00757, entitled "Delay Reduction for Transmission and Processing of Video Data," by Moshe Elbaz, Noam Eshkoli, Ilan Yona, and Aviv Eisenberg, filed Aug. 14, 2001, which is based on U.S. Provisional Patent Application No. 60/225,491, entitled "Delay Reduction for Video Transcoding and Continuous Presence," by the same inventors, filed Aug. 15, 2000. All of the above applications are incorporated herein by reference.

BACKGROUND

1. Field of the Invention

This invention relates generally to the field of video communication and, more particularly, to providing an efficient and easy way of controlling video communication.

2. Discussion of Prior Art

As the geographical domain in which companies conduct business continues to expand, video conferencing technology attempts to bring the world closer together. However, as with most user-based technologies, the user interface for controlling the conference does not provide a convenient way to handle all the options and capabilities of the conferencing equipment. When video conferencing is operated between endpoints that cannot communicate directly, (e.g., because they use different networks and standards), the endpoints must use a means for transcoding the data, such as a Media Gateway (MGW), to connect them together.

An endpoint is a terminal on a network capable of providing real-time one way or two way audio and/or visual communication with other terminals or with a control unit. When more than two endpoints participate in a conference, a Multipoint Communication Unit (MCU) is used to connect all the endpoints together.

Controlling video communications may be complicated by options to change the layout, add or subtract participants, and request statistical information, for example. Common control systems of video communications use external communication paths such as a phone call to a human operator, web controlling with a web browser at the user's site, and a web server that connects to the MCU, the MGW, or an Interactive Voice Response (IVR) unit. The IVR unit provides vocal messaging to the user and receives the user's response by using Dual Tone Multi-Frequency (DTMF) by, for example, a touch-tone telephone. None of the current video communication control systems provides a method or a system that enables the user to control the video communication, via a terminal (e.g., an endpoint) of the video communication. Moreover, none of the current video communication control systems provides visual information that can be viewed on the user's video display. Although possibly not recognized by the prior art, a visual display that presents various control options and features that are enabled by the MCU or the MGW and are selectable by the user may improve the ease of use and the user friendliness of the system. Similarly, the prior art may not recognize that a visual display that displays the results of the user's request may improve the ease of use.

Therefore, there is a need for a system or a method that enables control of the communication via an endpoint, such as a terminal, and/or displays control information of a video communication on the user's video monitor at the endpoint.

SUMMARY

The present invention may include, but is not limited to, a new way to control a conference that does not require external communication paths. For example, instead of an external communication path, an output video stream may be used to display menu options, and an input audio stream may be used to obtain commands and feedback from a user (i.e., an end user, conferee, or a conferencee).

In an embodiment of the present invention, the end user may be enabled to (1) control the conference by providing the end user visual menus that are sent as part of the video streams, and (2) obtain responses from the end user using a common signaling convention such as, but not limited to DTMF.

In another embodiment, interactive control of the conference is provided thereby facilitating, for example, changing the layout by pointing with a keypad and/or a pointing device (such as a mouse, trackball, touch sensitive pad, touch sensitive screen, or other such device for pointing to, selecting with, and/or moving the cursor) to the part that needs to be changed, or defining an area of interest on the screen that will get a special treatment that is different from the rest of the frame.

Other features and advantages of the present invention will become apparent upon reading the following detailed description of the embodiments with the accompanying drawings and appended claims.

BRIEF DESCRIPTION OF THE DRAWINGS

FIG. 1b is a flowchart showing the operation of the conferencing system of FIG. 1a;

FIG. 3 is a flowchart showing a process carried out by a control unit that operates according to an exemplary embodiment of the present invention;

FIG. 4 is a block diagram showing a Menu Generator (MG) that operates according to an exemplary embodiment of the present invention.

DETAILED DESCRIPTION OF EXEMPLARY EMBODIMENTS OF THE INVENTION

Figure 1A:
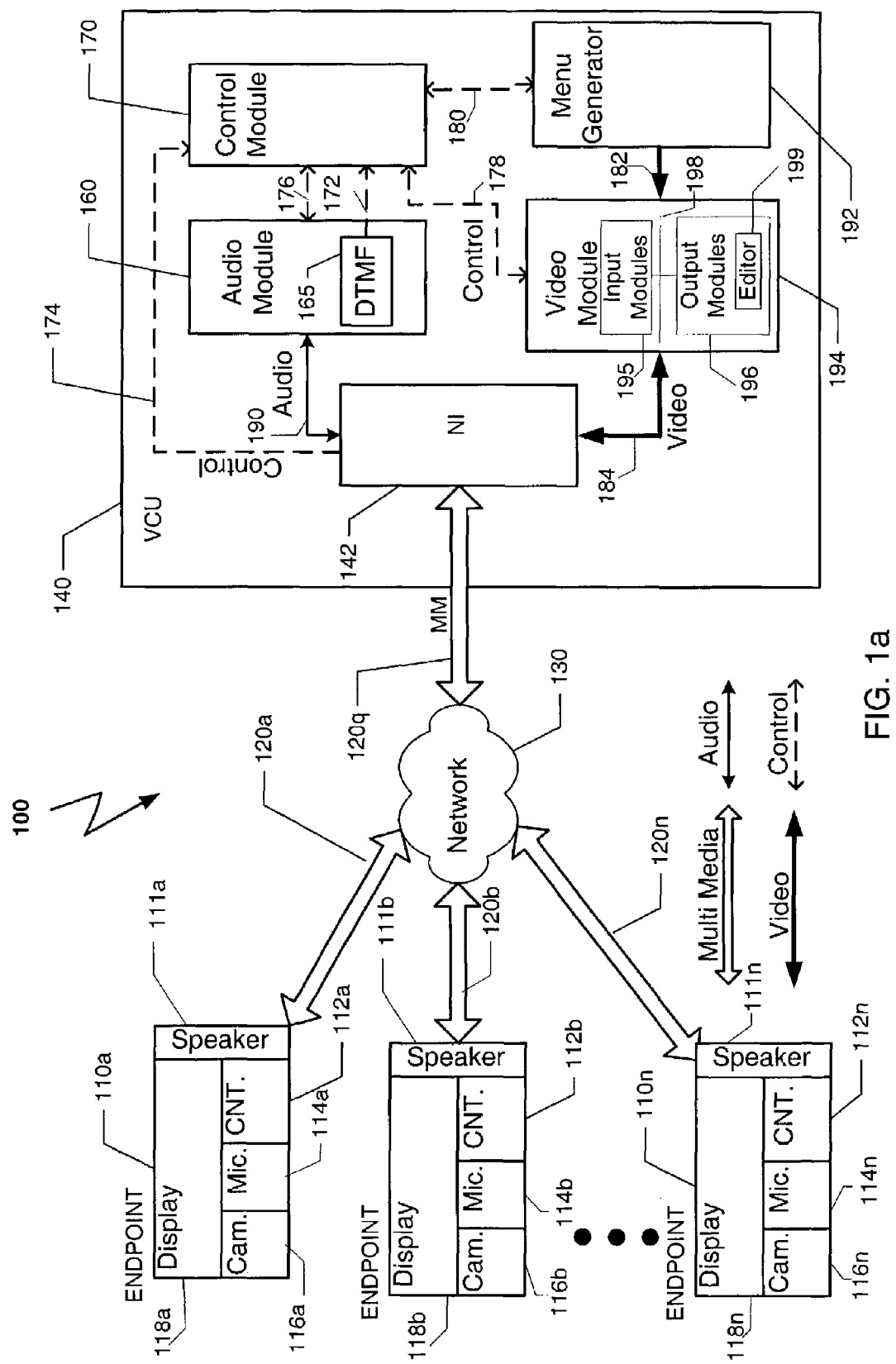
FIG. 1a is a block diagram showing a general description of a conferencing system.

Referring now to the drawings, in which like numerals refer to like parts throughout the several views, exemplary embodiments of the present invention are described.

FIG. 1a is a block diagram of a conferencing system 100 having a plurality of endpoints 110a-n with speakers 11a-n, user control devices 112a-n, microphones 114a-n, cameras 116a-n, displays 118a-n, and multimedia lines 120a-n, respectively. The conferencing system further comprises a multimedia line 120q, a network 130, and a Video Control Unit (VCU) 140. The VCU 140 further includes a Network Interface (NI) 142, an audio module 160 having a DTMF module 165, a control module 170 with control lines 172, 174, 176, 178, and 180, video lines 182 and 184, an audio line 190, a Menu Generator (MG) 192, and a video module 194 having input modules 195, output modules 196, and common interface 198. Each of the output modules 196 may include an editor 199. FIG. 1a is a general description of a typical environment in which the VCU 140 may be used. Alternative embodiments of the conference system may have other components and/or may not include all of the components shown in FIG. 1a.

In this application the words "unit" and "module" are used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

The control lines 172, 174, 176, 178, and 180; the video lines 182 and 184; the audio line 190; and the multimedia lines 120a-n and 120q may be lines specially designed for, and dedicated to, carrying control signals, video signals, audio signals, and multimedia signals, respectively. Alternatively, the control lines 172, 174, 176, 178, and 180; the video lines 182 and 184; the audio line 190; and multimedia lines 120a-n and 120q may be constructed from generic cables for carrying signals. In an embodiment, the control lines 172, 174, 176, 178, and 180; the video lines 182 and 184; the audio line 190; and the multimedia lines 120a-n and 120q may carry other signals in addition to signals described in this specification. In another embodiment, the control lines 172, 174, 176, 178, and 180; the video lines 182 and 184; the audio line 190; and the multimedia lines 120a-n and 120q may carry optical and/or electrical signals, may be paths of radio waves, or a combination thereof, for example. Each of these lines may actually be a pathway through a complex array of circuitry and/or components through which the corresponding signal travels, or may be a common memory buffer used for exchanging information. In embodiments in which the modules connected by any of these lines are software components, these lines may just represent an exchange of information.

The information communicated between the endpoints 110a-n and the VCU 140 includes indicators, audio information, video information, and data. The multimedia lines 120a-n convey information to the network 130, and the multimedia line 120q conveys the information to the VCU 140.

Any combination of endpoints 110a-n may participate in any given conference. The endpoints 110a-n may provide speech, data, video, or any combination thereof. Accordingly, the endpoints 110a-n may include speakers 111a-n, user control devices 112a-n, microphones 114a-n, cameras 116a-n, and displays 118a-n, respectively. Each of the endpoints 110a-n may contain a different combination of these components.

The user control devices 112a-n act as interfaces between the user and the VCU 140 associated with endpoints 110a-n. The user control devices 112a-n may be a dialing keyboard (e.g. the keypad of a telephone) that uses DTMF signals, a dedicated control device that may use other control signals in addition to DTMF signals, or a far end camera control signaling unit according to standards H.224 and H.281, for example. In one embodiment, the user control devices 112a-n may be keypads, for example, and/or have arrows keys for left, right, up, and down to navigate a cursor on a conference image (i.e., an image associated with a conference) or to shift a position of the conference image. In a further embodiment, the user control devices 112a-n may be software presenting virtual keypads on the displays 118a-n. In yet another embodiment, the user control devices 112a-n may include a DTMF generator such as common keypad of a touch-tone telephone and/or a remote control such as that used for a TV set.

Continuing the above discussion of the components of endpoints 110a-n, the microphones 114a-n allow users at the endpoints 110a-n to speak within the conference or contribute to the sounds and noises heard by other users. The speakers 111a-n allow the endpoints 110a-n to hear the conference. The cameras 116a-n allow the endpoints 110a-n to input live video data (such as images of the users associated with endpoints 110a-n or images of exhibits) to the conference. The displays 118a-n allow the conference to be viewed at the endpoints 110a-n. Those endpoints 110a-n that are missing one of the components may be limited in the ways in which they can participate in the conference.

In FIG. 1a, the plurality of endpoints 110a-n are connected via the network 130 to the Video Control Unit (VCU) 140. The VCU 140 may be a MCU or a Multimedia Gateway (MGW), for example. The MCU is a conference controlling entity. In an exemplary embodiment, the MCU may be a piece of equipment located in a node of the network 130 or in a terminal that receives several channels from access ports and, according to certain criteria, processes audiovisual signals and distributes them to connected channels. An example of a MCU is MGC-100, which is a product of Polycom, Inc. Network 130 may represent a single network or a combination of two or more networks such as Integrated Services Digital Network (ISDN), Public Switched Telephone Network (PSTN), Asynchronous Transfer Mode (ATM), the Internet, and/or an intranet, for example.

The paragraphs that follow often refer to a MCU as an example of the VCU 140 of the present invention. However, a Media Gateway (MGW) may be used instead of a MCU, and may be substituted for the MCU in the discussion below. Additionally, embodiments having a MCU may also use a MGW, which in turn may also be used for point-to-point communications between individual endpoints. When the MGW is used, the control options target the operation of the MGW. In an embodiment of the invention including a MGW, the user may be offered a list of subscribers to the MGW, and the user may be allowed to select which subscribers will be contacted via network 130 for participation in the conference, for example.

The NI 142 may be a logic unit. A logical module or logic unit is a module or unit that performs a certain functionality. In this specification the terms logical module, logic unit, and variations of these terms are used interchangeably. A logical module may comprise one or more elements, which may be hardware and/or software., The logical module may be located in one entity or spread over different entities, such as but not limited to a Digital Signal Processing Printed Circuit Board (DSP PCB), a processor, or different programs, for example. The NI 142 receives the multimedia communication from a plurality of the endpoints 110a-n via the network 130, and processes the multimedia communication according to communication standards such as, but not limited to, H.323, H.321, H.324, Session Initiation Protocol (SIP), and/or H.320. The NI 142 delivers audio, video, data, and control streams to the appropriate components of the VCU 140. Some communication standards require that the process of the NI 142 include multiplexing the incoming multimedia communication into audio, video, data, and control streams. When transmitting information to the endpoints 110a-n, the NI 142 receives separate streams from the various units of VCU 140, and processes the streams according to one of the communication standards. The NI 142 then transmits the streams via the multimedia line 120q to the network 130, which in turn transmits the streams via the multimedia lines 120a-n to the endpoints 110a-n. More information about communications between endpoints and/or MCUs over different networks, and information describing signaling, control, compression, and how to set a video call, for example, can be found in the International Telecommunication Union ("ITU") standards H.320, H.321, H.323, H.261 and H.263.

The audio module 160 receives, via the audio line 190, the compressed audio streams of the plurality of endpoints 110a-n from the NI 142. Subsequently, the audio module 160 processes the compressed audio streams, may mix the relevant audio streams (originating from the endpoints 110a-n), and sends the compressed mixed signal via the audio line 190 back to the NI 142, and then back to the endpoints 110a-n. Mixing the audio streams may not be needed if the MGW is used for the VCU 140. In one embodiment, the audio streams that are sent to each of the endpoints 110a-n may be different. For example, the audio streams sent to different ones of the endpoints 110a-n may be formatted according to different communications standards, according to the needs of the individual endpoints 110a-n. Also, as another example, the audio stream may not include the voice of a user associated with the one of the endpoints 110a-n that the audio stream is sent to, but the voice may be included in all other audio streams.

In an exemplary embodiment, the audio module 160 includes at least one DTMF module 165 that detects and grabs the DTMF signals from the audio stream. The DTMF module 165 then converts the DTMF signals into DTMF control data, and transfers the DTMF control data via the control line 172 to the control module 170. The DTMF control data may then be used to control the conference. The audio module 160 may also mix the audio streams of the plurality of endpoints 110a-n to form the audio portion of the conference as in the above embodiment in addition to processing the DTMF signals.

Other embodiments of the present invention may use a speech recognition module (not shown in FIG. 1a) in addition to, or instead of, the DTMF module 165. In these embodiments, the speech recognition module may use the user's vocal commands for controlling parameters of the videoconference.

Further embodiments of the present invention may use or have an Interactive Voice Recognition (IVR) module that instructs the user in addition to the visual menu. The audio instructions may be an enhancement of the video menu. For example, audio module 160 may generate an audio menu for instructing the user regarding how to participate in the conference and/or how to manipulate the parameters of the conference. The IVR module is not shown in FIG. 1a.

The control module 170 may be a logic unit that controls the operation of the VCU 140. In addition to common operations of the typical MCU, VCU 140 is capable of additional operations as result of having control module 170. Specifically, the control module 170 may include logic modules that process the instructions from the DTMF module 165 sent via the control line 172 and/or processes other dedicated control signals sent via the control line 174. The control module 170 may also control the menu generator 192, and instruct the video module 194 in regard to the output of the menu generator 192. Some unique operations of the control module 170 are described in detail below with respect to FIGS. 2 and 3.

The Menu Generator (MG) 192 may be a logic unit that generates the menus. The MG 192 receives commands via the control line 180 from the control module 170, and generates menu frames with relevant options for selection by the user. These menu frames are graphical images that are in a size and format that the video module 194 is capable of handling, and the menu frames are displayed on the displays 118a-n of the endpoints 110a-n, respectively. The menu frames may include text, graphic, and transparent information (i.e., information related to the extent to which the conference video image can be seen as background through a partially transparent foreground image as discussed further below regarding Bank Of Menus (BOM) 410 of FIG. 4). The menu frames may be displayed in addition to, or instead of, part of the common video image of the conference. In one exemplary embodiment, the MG 192 may be part of the video module 194. The operation of the MG 192 is described in detail below with respect to FIGS. 2 and 4.

The video module 194 may be a logic module that receives and sends compressed video streams. The video module 194 may include (1) the input modules 195 that handle compressed input video streams from a participating endpoint of the plurality of endpoints 110a-n; and (2) the output modules 196 that generate composed compressed output video streams (that are composed from several input streams to form a video stream representing the conference) for designated endpoints of the plurality of endpoints 110a-n. The input modules 195 include at least one video input module, but may include any number of video input modules. For example, there may be one video input module for each of the endpoints 110a-n. Similarly, the video output modules 196 include at least one video output module, but may include any number of video output modules. For example, there may be one video output module for each of the endpoints 110a-n, each video output module producing a screen layout that is individualized to a particular endpoint of the plurality of endpoints 110a-n.

The uncompressed video data is shared by the input modules 195 and the output modules 196 on the common interface 198 such as, but not limited to, a Time Division Multiplexing (TDM) interface, an Asynchronous Transfer Mode (ATM) interface, and/or shared memory. The data on the common interface 198 may be fully uncompressed or partially compressed. An exemplary operation of such a video module 194 is described in U.S. Pat. No. 6,300,973, cited above. Another exemplary embodiment of the video module 194 is described in U.S. Provisional Patent Application No. 60/225,491 and PCT Application Number PCT/IL01/00757, also cited above. Different types of output modules may be included in the plurality of output modules 196.

In an exemplary embodiment, each one of the plurality of output modules 196 may include an editor 199. In this embodiment, the video data from MG 192 is grabbed by the appropriate output modules 196 from the common interface 198, and each of the appropriate output modules transfers the video data to the editor 199. The editor 199 builds the output video frame from the different video sources, and also composes the menu frame into the next frame of memory. The editor 199 may treat this output video frame as an additional video source and add it to the layout as one of the rectangles or windows of the screen layout. Each rectangle or window of the screen layout may contain an image from a different endpoint, such as the picture of the user associated with that endpoint. In another exemplary embodiment, video data from the MG. 192 may be placed above, below, or on one of the sides of the other images of the screen layout. Other exemplary editors may treat the video data from the MG 192 as a special video source and display the menu as partially transparent and in front of the screen layout of the conference using the functionality of the transparent information so that the screen layout behind the menu can still be seen. In an exemplary embodiment, the editor 199 may be the same as the editor of U.S. Pat. No. 6,300,973. In one embodiment, different output modules of the plurality of output modules 196 may have different editors 199.

In some embodiments, the MG 192 may be a separate unit that generates the required menu to more than one of the output modules 196, or the MG 192 may be a module in each of the output modules 196 for generating individualized menus that are requested by the endpoints 110*a-n* that are receiving the video information from the corresponding output modules 196. In one embodiment, the menus may be individualized in their entirety. For example, the menus may be individualized in their setup, look, and appearance according to the requests of the individual endpoints 110*a-n*. Alternatively, the appearance of the menus may be essentially uniform, but the menus are individualized in terms of when the menus appear and which features are indicated as being selected.

The presentation of visual control to the endpoints 110*a-n* is an option that may be selected by a moderator of a conference while he or she reserves and defines the profile of the conference. The moderator may be associated with one of the endpoints 110*a-n*, and may use the user control devices 112*a-n* to make the selections and define the profile of the conference. The moderator may determine whether the conference participants will have the ability to control the settings (parameters) of the conference (using their respective user control devices 112*a-n*) during the conference. For example, when allowing the participants to have the ability to control the settings of the conference, the moderator selects a corresponding option "ON" in the conference profile.

Upon initiating the conference, the control module 170 checks the conference profile and determines whether the option to give the users control of the settings is on. If the option is on, the control module 170 instructs the output modules 196 in the video module 194 to add the video data output from the MG 192 as one of the video sources of the conference.

Figure 1B:
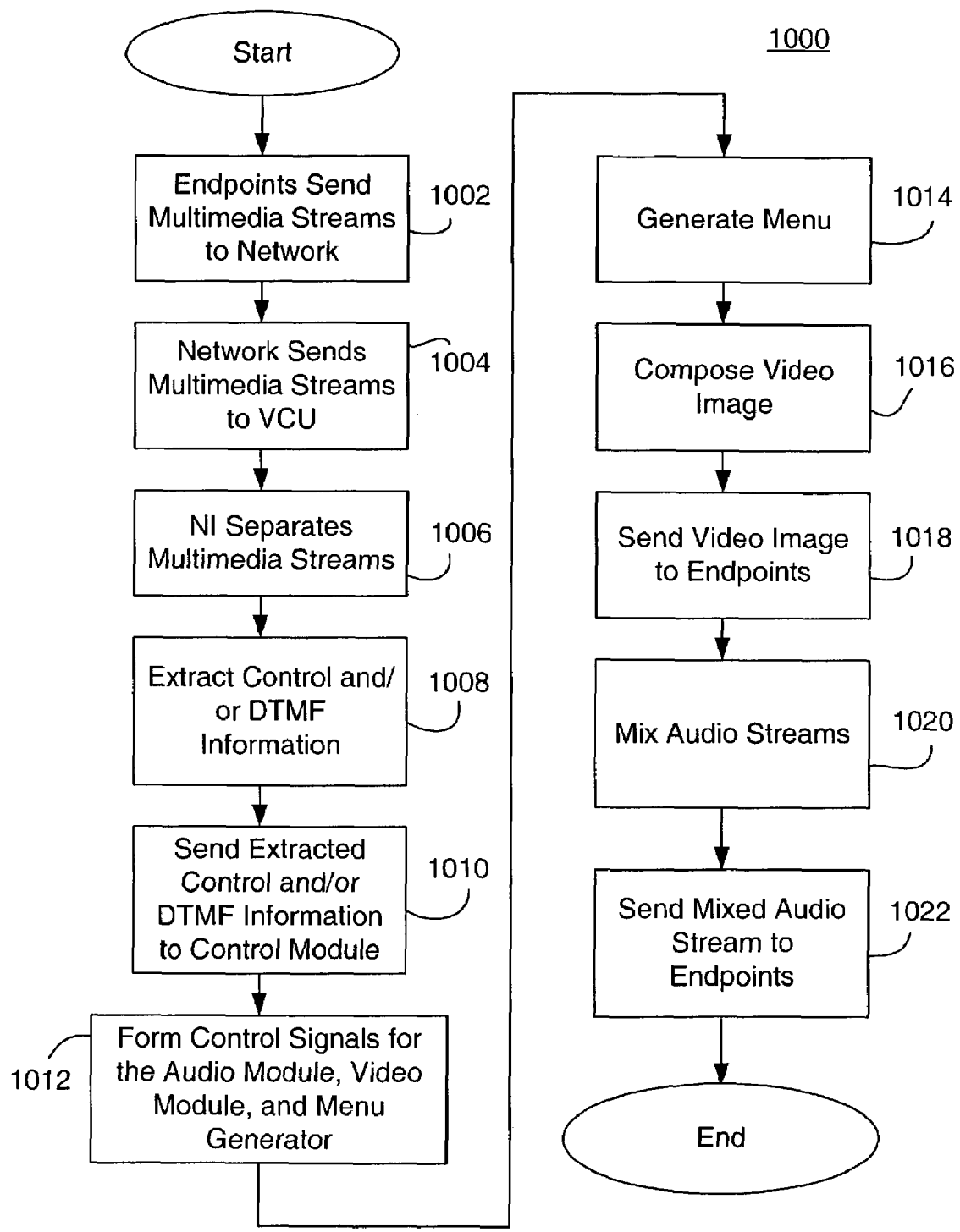

FIG. 1*b* is a flowchart of a method 1000 of the operation of the conferencing system 100 of FIG. 1*a*. Generally, FIG. 1*b* describes a single loop including endpoints 110*a-n* sending signals to the VCU 140, which processes the incoming signals to compose outgoing signals that are sent back to the endpoints 110*a-n*. The incoming signals may include images and sounds (e.g., voices) of individuals at selected ones of the endpoints 110*a-n*, for example. Some of the images may be associated with sounds, while some images may have no sound associated with them, and likewise some sounds may have no images associated with them. The outgoing signals are composites of the incoming signals that represent the conference. The loop of FIG. 1*b* is repeated continuously throughout the duration of the conference. Optionally, multiple loops of the method 1000 may overlap and/or occur simultaneously.

In step 1002, the endpoints 110*a-n* send multimedia streams, via the multimedia lines 120*a-n* to the network 130. The multimedia streams may include sounds, images, and/or control information associated with various end users at the endpoints 110*a-n*. In step 1004, the network 130 transfers the multimedia streams, via the multimedia line 120*q*, to the VCU 140 where the multimedia streams are received by the NI 142. Thus, sending messages from the endpoints 110*a-n* to the VCU 140 is accomplished using steps 1002 and 1004.

In step 1006, the NI 142 separates the multimedia stream into a control stream on the control line 174 for use by the control module 170, an audio stream on the audio line 190 for use by the audio module 160, and a video stream on the video line 184 for use by the video module 194. By separating the multimedia streams, each of the audio stream, video stream, and control stream can be separately processed.

Next, in step 1008, the DTMF module 165 extracts DTMF signals from the audio stream. Alternative embodiments may use other control signals instead of or in addition to DTMF signals that are mixed with the audio stream. Those alternative embodiments may use frequencies other than those used for the DTMF or may use other types of modulation. In embodiments in which the audio stream carries non-DTMF control signals, the audio module 160 may comprise other types of detectors adapted to these non-DTMF control signals in addition to, or instead of, a detector that includes the DTMF module 165. The other module is adapted to the control signaling. Also in step 1008, part of or all the control information may also extracted by NI 142 and sent over control line 174 to control module 160. Thus, the audio stream is capable of carrying control information in addition to the control stream. Subsequently, in step 1010, the DTMF signals are converted into control data that is sent on control line 172 to the control module 170. Thus, control module 170 may receive control information extracted from both the audio stream and the control stream.

Control signals for the audio module 160, the video module 194, and the MG 192 are formed based on the control stream, the DTMF information/data, and the control information in step 1012.

In step 1014, the control module 170 sends the audio control signal (formed in step 1012) on the control line 176 to the audio module 160, a video control signal on the control line 178 to the video module 194, and a menu control signal on the control line 180 to the MG 192. Subsequently, the MG 192 generates a menu that is sent on video line 182 to video module 194. The menu may be in response to a request made in step 1002 by one of the plurality of endpoints 110*a-n*, and can be used for controlling the conference. Optionally, the MG 192 may generate an audio menu and/or audio enhancements to the visual menu that is sent to the audio module 160 as part of step 1014. For example, the audio menu may replace the video menu for those endpoints 110*a-n* that do not have displays 118*a-n*.

In step 1016, a video signal is composed from the video stream carried by video line 184 and the menu carried by video line 182. The composed video signal contains information for forming an image of the conference having the menu image superimposed thereon. The purpose of the composition of step 1016 is so that several different images (one of which may be that of the menu) may be arranged on one screen in different locations according to a screen layout. Each of the different images may come from a different one of the endpoints 110a-n, except that the image of the menu (if present) comes from the MG 192.

At the end of step 1016, the image associated with the composed video signal (of step 1016) has not been formed on any of the displays 118a-n, yet. In step 1018, the composed video signals are sent to the endpoints 110a-n allowing the endpoints 110a-n to view the image associated with the video signal composed in step 1016. After the image associated with the composed video signal appears on the displays 118a-n, one or more endpoints 110a-n may manipulate the conference parameters via the menu generated.

Steps 1014, 1016, and 1018, discussed above, describe forming the video image of the conference on the displays 118a-n, while the discussion of steps 1020 and 1022 that follows describes forming the audio portion of the conference so that it can be heard on the speakers 111a-n. In step 1020, the audio module 160 mixes the audio streams from the endpoints 110a-n to produce an audio stream of the conference. Finally, the mixed audio stream is sent to the endpoints 110a-n in step 1022. The steps of method 1000 relating to the forming of the composed video image may be independent from the forming of the mixed audio stream, and may therefore be performed simultaneously or in any order with respect to one another.

Figure 2A:
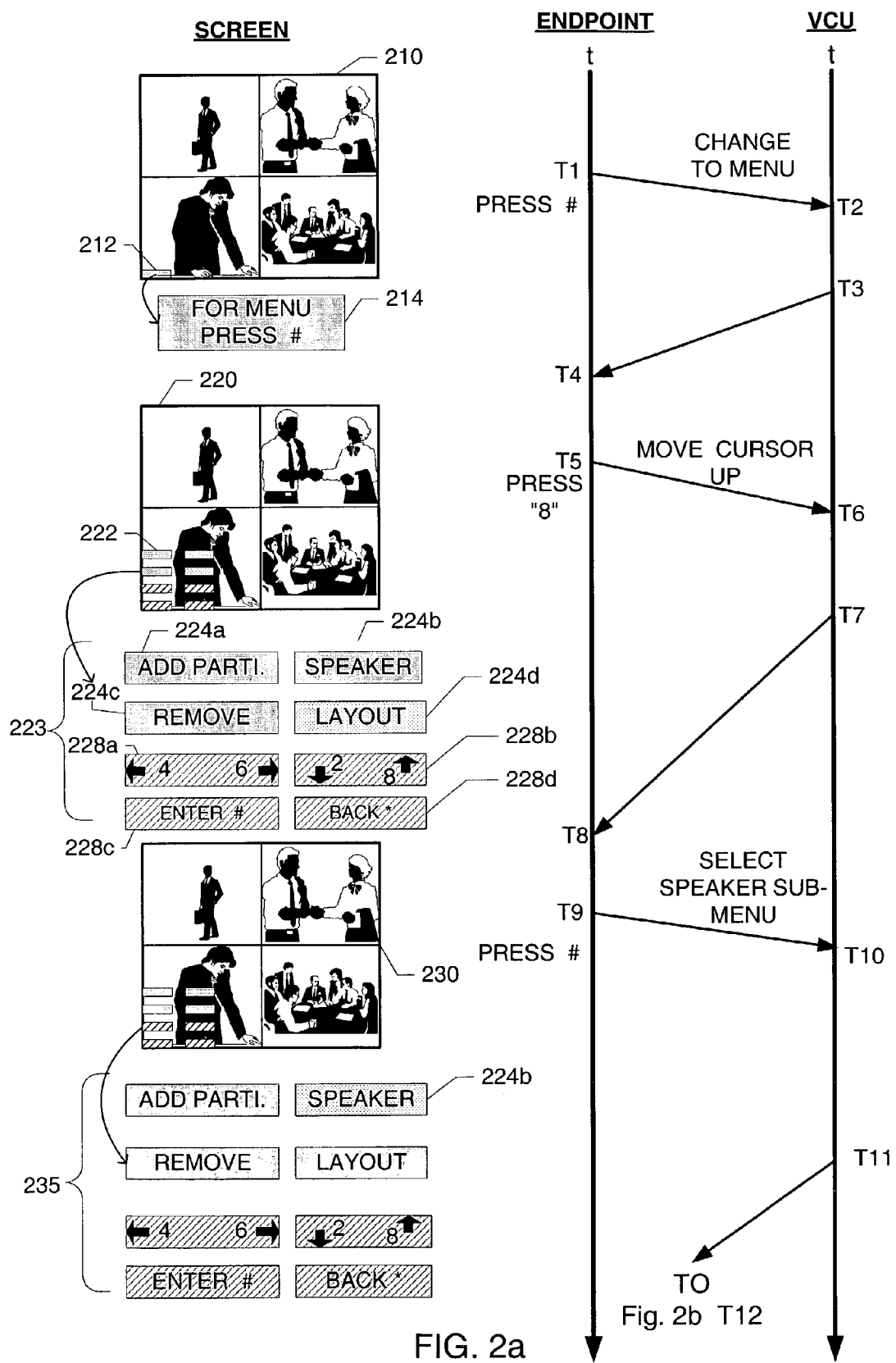
FIG. 2a and FIG. 2b are timing diagrams showing a screen of an endpoint operating according to an exemplary method of the present invention.
Figure 2B:
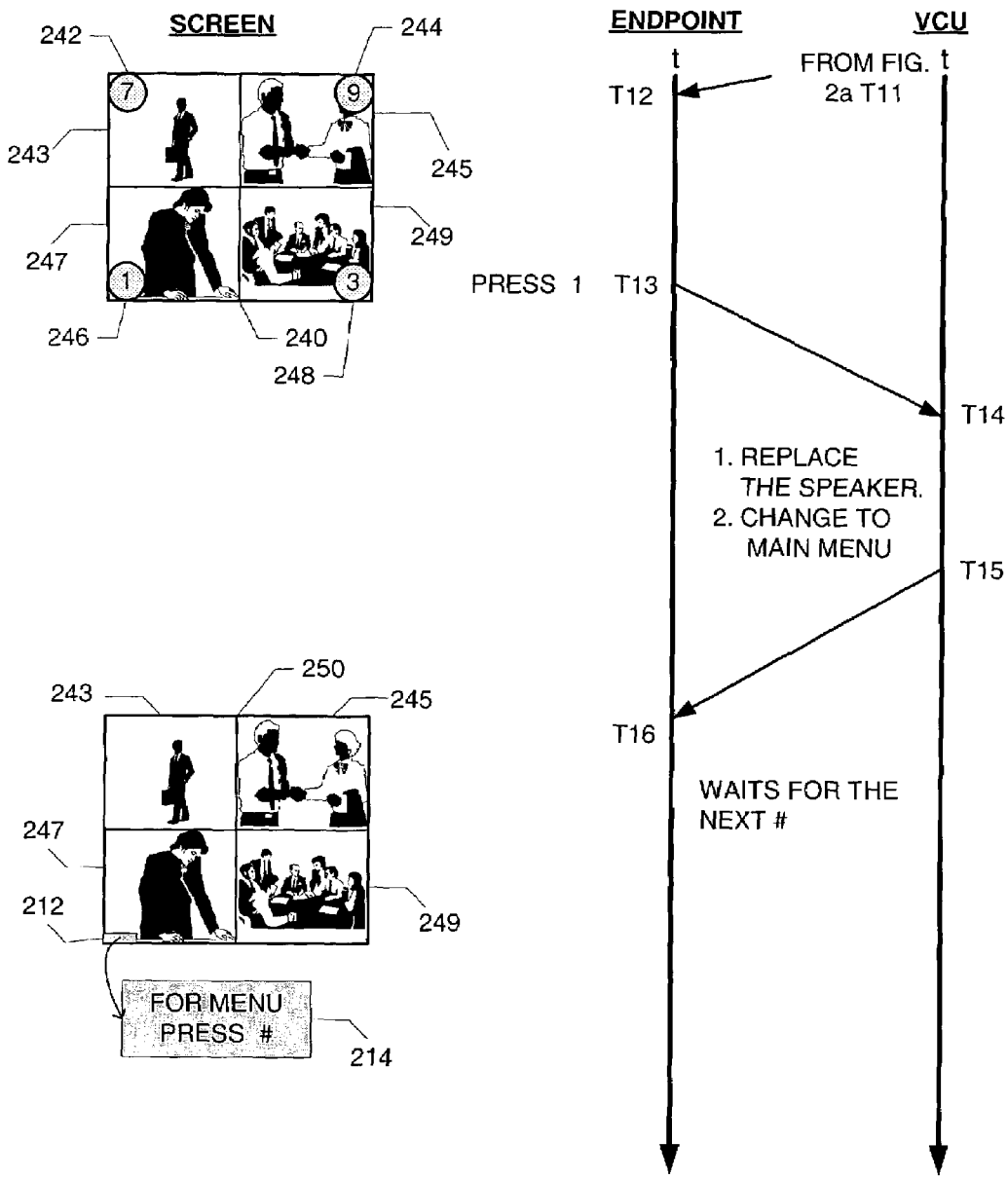

FIG. 2a and FIG. 2b are timing diagrams that illustrate screens of an endpoint that operates according to an exemplary method of the present invention. Each of FIGS. 2a and 2b are divided into two sections. The left section illustrates exemplary images displayed on the screens of the displays 110a-n. The right section shows two time axes and arrows illustrating how the events on the two axes are sequenced with respect to one another. The left time axis, labeled "ENDPOINT," illustrates the operations of the user of one of the endpoints 110a-n. In other words, the operations of the user occur during time intervals in which the events FIGS. 2a and 2b are occurring on the left time axis (i.e., time intervals T4 to T5, T8 to T9, and T12 to T13). During these time intervals, the user is deciding how to respond to the change in the menu of the screen. The right axis, labeled VCU, illustrates the sequence of events associated with the VCU 140. Specifically, during time intervals T2 to T3, T6 to T7, T10 to T11, and T14 to T15, the VCU 140 processes the signals sent by the endpoint and produces a response. Thus, each sequence of time representing sequences of events starting on the left time axis, continuing on the right time axis, and ending on the left time axis (i.e., T1-T4, T5-T8, T9-T12, and T13-T16) occur during one loop of FIG. 1b. For clarity, neither of the two time axes (labeled "ENDPOINT" and "VCU") are drawn to scale; the relative sizes of the times intervals have no meaning.

In the exemplary embodiment of FIG. 2a, a screen 210 illustrates an ongoing videoconference with a 2×2 layout (i.e., a 2×2 layout is four images arranged in a 2×2 rectangle). A menu tab 212 may appear at the bottom left corner of the screen 210 (which is enlarged for illustrative purposes below as menu tab 214). The purpose of the menu tab 212, in this embodiment, is to instruct the user to push "#" key or any other predefined signaling, when the user wishes to change the current settings (which in turn changes the parameters) of the conference. In alternative embodiments, those endpoints 110a-n having other control signaling and having more extensive keyboards or keypads may be capable of selecting the menu tab 212 by pushing the "enter" or "back" key or by clicking on a pointing device (such as a mouse, trackball, touch sensitive pad, touch sensitive screen, or other such device for pointing to, selecting with, and/or moving the cursor).

At time t=T1, the user presses the "#" button on one of the user control devices 112a-n. Upon receiving the "#" signal at the DTMF module 165 at time t=T2, the control module 170 instructs the MG 192 to generate the main menu, and to submit the main menu to an appropriate one of the output modules 196 via the common interface 198 of the video module 194. Upon initiating the conference, the control module 170 sets the output modules 196 of the video module 194 to grab and/or receive the information from the MG 192, to add the information to the composed video signal, and then to compress the composed video. Next, at time t=T3, the composed and compressed video signal is transferred to the appropriate one of the endpoints 110a-n.

After transferring the composed and compressed video signal (i.e., at time t=T4), the user sees a screen 220 with the 2×2 layout and a main menu 222, which is enlarged below as main menu 223. As an example, the main menu 223 may include eight rectangles. The four upper rectangles are function keys 224a-d, which change the settings (thereby changing the parameters of the videoconference) of the communication. For example, the function key 224a, entitled "ADD PARTI," may add a participant to the conference, while the function key 224b, entitled "SPEAKER," chooses one of the endpoints 110a-n functions as the speaker. As further examples, the function key 224c, entitled "REMOVE," removes a participant from the conference, and the function key 224d, entitled "LAYOUT," changes the screen layout from that of the screen 220. Additional functionality may be provided by including other similar additional function keys within the menu 223. The additional functionality may control other parameters of the videoconference, such as but not limited to, visual effects on the screen. For example, the parameters may control the appearance of borders between the participants, and background colors. Alternatively, other function keys may be utilized instead of the examples provided. Currently, the cursor is pointing at the function key 224d. Accordingly, three of the four upper function keys 224a-c (i.e., ADD PARTI, SPEAKER, and REMOVE) are in gray, while the function key 224d (LAYOUT) is dotted or dithered to signify the presence of the cursor.

The other four rectangles 228a-d in the exemplary embodiment indicate information to the user about the functionality of the present user control devices 112a-n of the endpoints 110a-n. In this embodiment, the rectangles 228a-d merely convey information to the user on how to use the menu. Rectangles 228a-d can be used by, and may be convenient for, any of endpoint 110a-n. However, rectangles 228a-d may be particularly useful for those of endpoints 110a-n that use DTMF signals (e.g., those endpoints using telephone keypads) and therefore may not have ready access to an arrow key, for example. In this example, pressing the "4" moves the cursor to the left, and pressing the "6" moves the cursor to the right as depicted in rectangle 228a. Similarly, pressing the "2" moves the cursor down, and pressing "8" moves the cursor up as depicted in rectangle 228b. Rectangle 228c is entitled, "ENTER #" to convey the message that pressing the "#" key selects the function that is currently being pointed to by the cursor. Similarly, rectangle 228c is entitled, "BACK *" to convey the message that pressing the "*" key returns the user to the previous menu. For example, pressing the "*" key may return the user to menu tab 212 on the ongoing display, thereby restoring the screen image to that of the screen 210 in which the main menu 223 in not displayed. In one embodiment, the rectangles 228a-d may be replaced with a number of function keys having the navigation functions indicated in rectangles 228a-d or other function keys. In another embodiment, screen selections can be made by pressing an "enter" or a "back" key of a keyboard, while the cursor can be navigated using arrow keys of the keyboard and/or using a pointing device. In a further embodiment, some endpoints 110*a-n* may be presented with the rectangles 228*a-d*, while others may have the rectangles 228*a-d* replaced with function keys of other shapes or forms, for example, according to the selections of the user associated with that endpoint, the conference manager, and/or the system used for the endpoint.

At t=T5, the user presses "8" as an instruction to move the cursor up. Upon receiving the signal "8," at time t=T6, the control module 170 instructs the MG 192 to generate a main menu 235, which is the same as main menu 223, but with the cursor now on the function key 224*b*, entitled "SPEAKER." Then, at time t=T7, the control module 170 submits the main menu to the appropriate one of output modules 196 via the common interface 198 of the video module 194. Next, at time t=T8, the user sees a screen 230 with the 2×2 layout and the main menu in the bottom left corner, which is enlarged below, and the (SPEAKER) function key 224*b* is dithered indicating that the location of the cursor is on the (SPEAKER) function key 224*b*.

At time t=T9, the user presses the "#" key indicating that the user selects the (SPEAKER) function key 224*b*. Upon receiving the signal "#," at time t=T10, the control module 170 instructs the MG 192 to generate the speaker submenu (i.e., screen 240) illustrated in FIG. 2*b*, and to submit the speaker submenu to the appropriate one of the output modules 196 via the common interface 198 of the video module 194. Subsequently, at time t=T11, a screen image including the speaker submenu (i.e., screen 240) is sent to the appropriate one of the endpoints 110*a-n*. After receiving the speaker submenu, at time t=T12, the user sees the speaker submenu (i.e., screen 240), with the 2×2 layout and a selection button on each participant (i.e., selection button 242 is on participant 243, selection button 244 is on participant 245, selection button 246 is on participant 247, and selection button 248 is on participant 249). Thus, pressing "7" on the keypad of the appropriate one of the endpoints 110*a-n* will select the participant 243 of the top left corner (as indicated by selection button 242) as the speaker; pressing "9" will select the participant 245 of the top right corner as the speaker (as indicated by selection button 244); pressing "1" will select the participant 247 of the bottom left corner as the speaker (as indicated by selection button 246); and pressing "3" will select the participant 249 of the bottom right corner as the speaker (as indicated by selection button 248).

In the example at time t=T13, the user presses "1" selecting the bottom left participant 247 as the speaker. Next, at time t=T14 upon receiving the signal "1," the control module 170 instructs the MG 192 to generate the menu tab 212 (FIG. 2*a*). Subsequently at time t=T15, the menu 212 is submitted to the appropriate one of the output modules 196 via the common interface 198 of the video module 194 (FIG. 1*a*). The user then obtains a screen 250 at time t=T16. In parallel, the control module 170 instructs the audio module 160 that the participant of the lower left corner is selected as the only speaker of the conference.

Figure 2C:
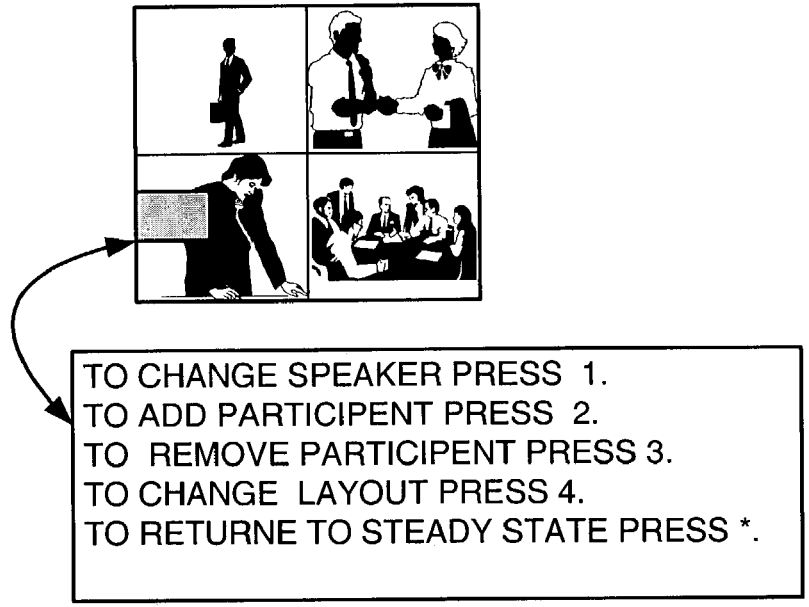
FIGS. 2c-f show different types of menus displayed on a screen of an endpoint that operate according to an exemplary method of the present invention.
Figure 2D:
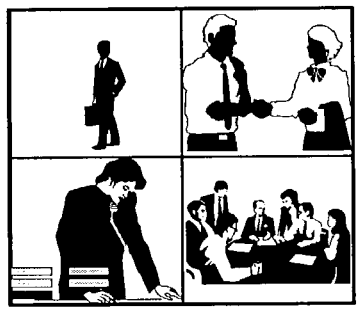

Other types of menus may be used by this or other embodiments of the present invention. For example, a text menu may be provided as illustrated in FIG. 2*c*. Other embodiments may use a graphical menu with shapes that include the key icon on which the user must press to select the key, as illustrated in FIG. 2*d*, for example.

Figure 2E:
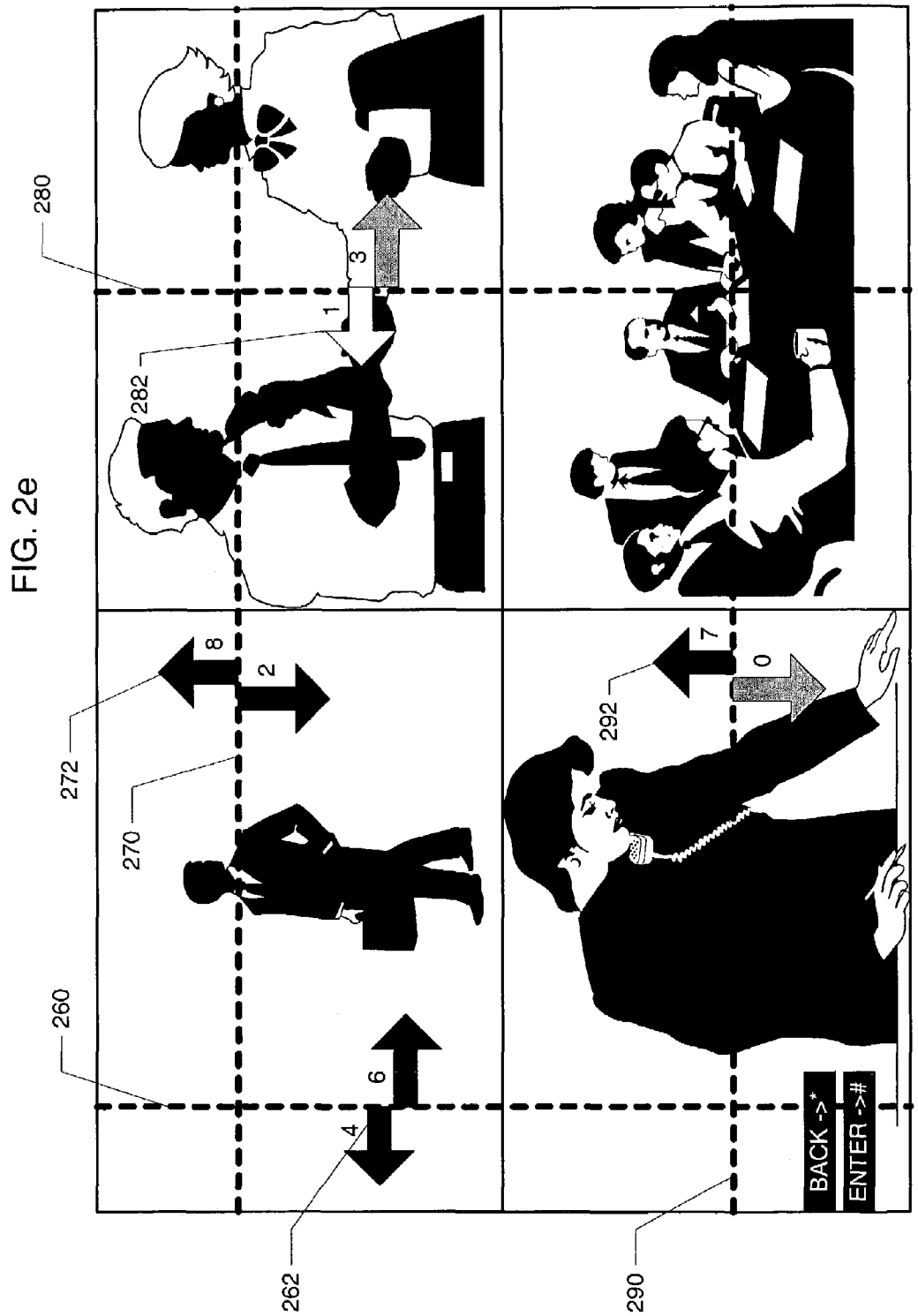

Another type of menu may be an interactive menu. An example of an interactive menu is illustrated in FIG. 2*e*. An interactive menu may be used by an end user to mark an area of interest, for example. In one embodiment, the area of interest may be expanded by a zoom function. Alternatively, an interactive menu may be used to define a region in which an encoder should concentrate its time and resources in order to provide better video quality in this region.

For example, the MG 192 generates four cursor lines—two vertical lines 260 and 280, and two horizontal lines 270 and 290. Each cursor line can be moved in two directions by using control arrows/numbers 262, 272, 282, and 292. For example, pressing the number "4" will move the vertical line 260 to the left as indicated by the arrow 262. Pressing the "#" may indicate that the area between the four cursor lines is the area that the user is interested in. Pressing the "*" may instruct the system to return to the menu tab. Alternatively, vertical lines 260 and 280 and horizontal lines 270 and 290 can be moved with other control signals by moving the cursor onto a desired location, which can be done using a pointing device or using the arrows on a keyboard, for example. Then, the line having the cursor is selected by pressing the enter button on the keyboard or clicking with the pointing device, for example. Next, the selected line is moved by dragging with the pointing device or using the arrow buttons of the keyboard, for example.

Figure 2F:
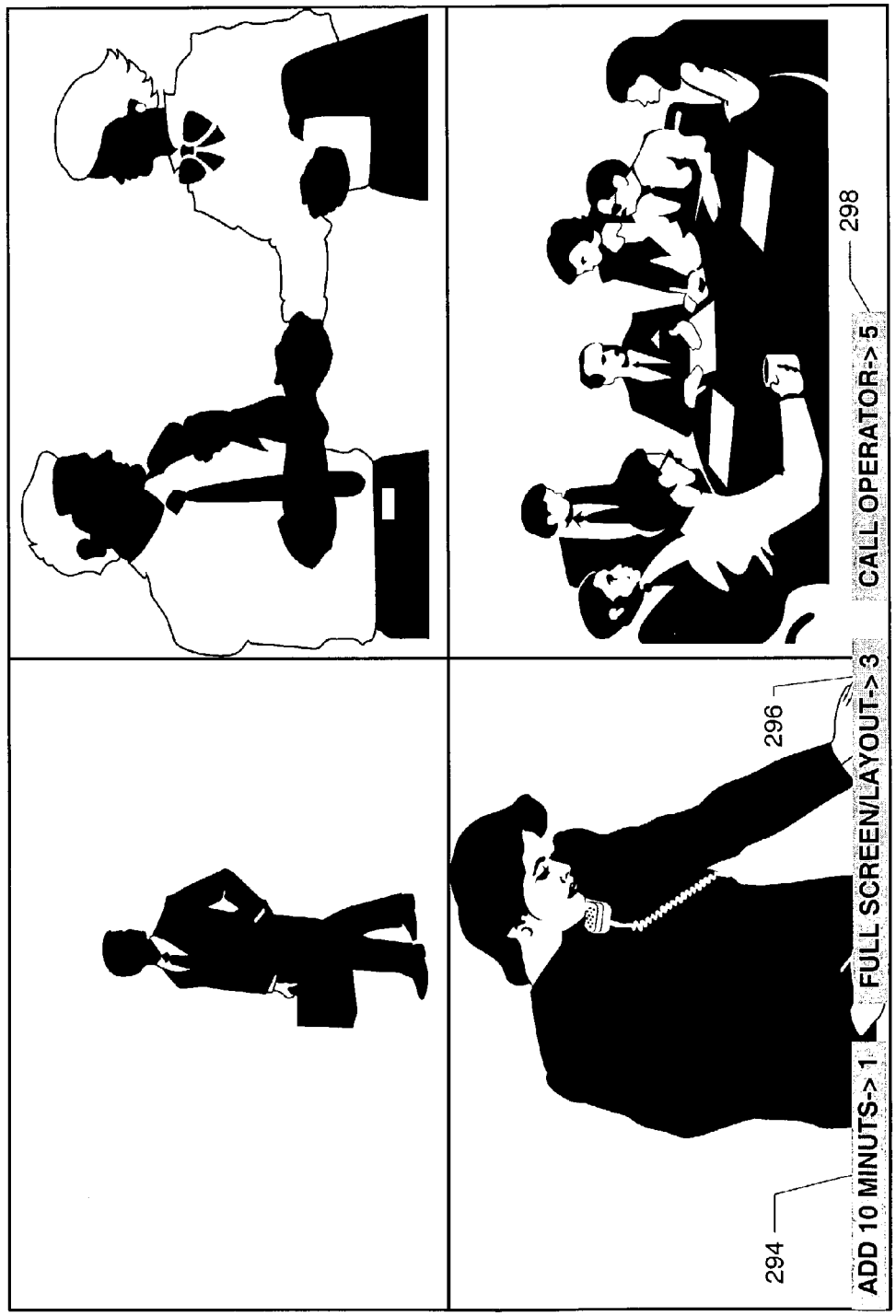

FIG. 2*f* illustrates another type of menu that is used by an alternative embodiment of the present invention, having menu items 294, 296, and 298. This embodiment may use a static menu that is displayed during the whole conference instructing the user that pressing certain keys in his or her user control device (e.g., user control devices 112*a-n*) will cause the VCU 140 to change some parameters of the conference. For example, the menu item 294 instructs the user that pressing "1" will add ten minutes to the reserved duration of the conference, and pressing "3" will toggle the layout on the screen of the relevant endpoint between two states (i.e., menu item 296). The first state displays the speaker on a full screen and the second state displays the reserved layout, which is 2×2 for this example.

Other embodiments may implement some functions as instructions written in a user guide or may be written on the user control devices 112*a-n* (FIG. 1*a*) instead of displaying them on the screen. For example, in this embodiment, instructions that pressing "1" will add ten minutes to the reserved duration of the conference and pressing "3" will toggle the screen of the relevant endpoint may appear on the user control devices 112*a-n*. In this embodiment, the VCU 140 may not have a menu generator. The control module 170 of this embodiment of VCU 140 controls the video module 194 or the audio module 170 according to the selected control option of the user.

FIG. 3 is a flowchart illustrating an exemplary method 300 that is carried out by the control module 170 according to an embodiment of the present invention. The method 300 starts at step 301 where upon initiating the conference, the control module 170 checks the conference profile and determines whether the option of using the visual control is on. If the visual control is on, the control module 170 instructs the output modules 196 that are assigned to the appropriate endpoints to add the video data output from the MG 192 as one of the video sources for the output modules 196. Other embodiments may permanently use the visual control rather than provide them as options.

Step 310 is a part of a process of periodically checking for the "#" signal indicating that the user wishes to view the main menu. In step 310, the control module 170 waits a period of time and then checks if the "#" signal from the DTMF module 165 was received. If the "#" signal was not received, the method goes to the beginning of step 310, and again waits for a period of time before checking for the "#" signal. The period of time is short enough so that the user perceives the response of the VCU 140 as essentially instantaneous. If the "#" signal was received, the method continues to step 315 where the control module 170 instructs the MG 192 to submit the main menu with the cursor in an initial position to one of the output modules 196 that corresponds to the one of the endpoints 110*a-n* that made the request. The control module 170 waits for a period of time, and checks for a response from the user of the one of the endpoints 110*a-n* in step 320. If there is no response, the method returns to the beginning of step 320, and waits for a period of time before checking again. Similar to step 310, the period of time that step 320 waits is short enough that the user perceives the response of the VCU 140 as essentially instantaneous.

Upon receiving a response from the DTMF module 165, the control module 170 determines how to proceed. If the signal is that of step 322, which is "4" in the current example, the control module 170 performs step 324 (i.e., moving the cursor left if applicable). If the control module 170 cannot move the cursor left, the control module 170 instructs the MG 192 to display the same menu with a different background color around the "4." The different color indicates to the user that the user made a mistake, and the user has to choose another selection from the menu. However, if the cursor can be moved to the left, the control module 170 instructs the MG 192 and the video module 194 to display the main menu but with the cursor on the rectangle to the left of where it was previously (before the "4" was pressed).

If the signal is that of step 326, which is "6," the control module 170 performs step 328. Step 328 is similar to step 324 except the cursor moves to the right and not to the left. If the signal is that of step 336, which is "2," the control module 170 performs step 338, which moves the cursor downward. Finally, if the signal is that of step 332, which is "8," the control unit performs step 334, which moves the cursor upward. In each case if the cursor cannot be moved in the direction requested, the background of the improper selection is changed. In an embodiment, the selections that are improper are indicated as such by the coloring of their respective backgrounds before the user attempts to make an improper selection. After any of steps 324, 328, 338, or 334, method 300 returns to step 315 to wait for the next signal.

If while waiting in step 320 the signal is that of step 340, which is "#," the control module 170 selects the appropriate subroutine from a bank of submenu routines 350*a-m*. In this embodiment, the "#" signal is the result of the user selecting the function key that is currently being pointed to by the cursor. A detailed description of a submenu routine has been described above in reference to FIGS. 2*a* and 2*b*, which illustrates a submenu routine for choosing the speaker of the conference. There could be any number of submenu routines 350*a-m*. The number of submenu routines 350*a-m* is unrelated to the number of endpoints 110*a-n*. At the end of the selected one of the submenu routines 350*a-m* the control module 170 returns to step 310 and waits for the next "#" signal.

Returning to step 320, if the signal is that of step 360, which is "*," the control module 170 instructs the MG 192 to deliver the menu tab, and subsequently returns to step 310 and waits for the next "#" signal. In this embodiment, the purpose of the "*" signal is to return to the menu tab. Other exemplary embodiments may use other keys for the same functionality. Alternatively, other functions may be provided for other keys.

In an embodiment of the present invention, step 1014 of method 1000 (FIG. 1*b*) is closely related to, but not identical to, the method 300. Specifically, step 1014 may correspond to one inner loop of the method 300 (starting with step 320 and ending with a return to step 315, or with one of steps 350*a-m*, or 360).

FIG. 4 is a block diagram illustrating an example of the Menu Generator (MG) 192 according to an embodiment of the present invention. The MG 192 may include a Bank of Menus (BOM) 410, a Cursor Generator (CG) 413, a text generator 416, a Bank Of Graphic Objects (BOGO) 418, a builder 420, a Bank Of Frames Memory (BOFM) 430, a Common Interface Adaptor (CIA) 440, and a controller 450. Alternative embodiments of MG 192 may include more, less, or alternative components.

The BOM 410 may be a memory storing a plurality of ready menu images or characteristics that are superimposed on the conference image. Each menu image is organized by pixel coloring and screen resolution. For example, the menus having the resolution of Common Intermediate Format (CIF) may be stored together in one group, while menus having other resolutions may be stored in other groups. CIF is a video conferencing format that specifies a video frame containing 288 lines and 352 pixels per line. Each pixel has the appropriate color values according to some color space representation and may have transparency values also. The transparency value may be selected from a plurality of values from fully transparent to fully opaque. The BOM 410 may be a temporary bank of menus that is regenerated for each conference, for example.

The menu frame is superimposed on the conference video frame as an upper layer. The superimposing operation is done as a function of the transparency value for each pixel. Full transparency means that the video pixel of the layer below the menu (i.e., the layer of the conference) is visible through the menu layer. An opaque value means that the video pixel of the layer below the menu (i.e., the layer of the conference) is not visible through the menu layer. A partially transparent value means that the value of the pixel is a combination of the value of the menu and the value of the pixel below.

The CG 413 generates the cursor, which points to, or is placed on, a menu item. If the interactive option is in use, the CG 413 may control the movement of the cursor on the screen. For example, the CG 413 may control the movement of the four cursors lines 260, 280, 270, and 290 in FIG. 2*e*.

The text generator 416 may convert a string of text into graphic items, which are added to the menu. The text generator 416 may be adapted to different fonts and languages. In one embodiment, the text generator 416 may be used in the creation of a new BOM 410. Alternatively, the text generator 416 may not be present in embodiments having a permanent BOM 410.

The BOGO 418 includes the different graphic shapes and icons that may be used in the menu. The icons may be placed in the menu to give graphical representations of an item. In some embodiments, text from the text generator 416 may be placed within the icon or near a corresponding icon. In some embodiments, selecting the icons may cause one of the routines 350*a-m* (FIG. 3) to be selected. In one embodiment, the BOGO 418 may be used for the creation of a new BOM 410 if the BOM 410 is temporary. Alternatively, the BOGO 418 may not be present in embodiments having a permanent BOM 410.

The builder 420 grabs and/or receives the appropriate data from the various data generators (e.g., BOM 410, GC 413, text generator 416, and BOGO 418). The builder 420 composes the various elements into a menu frame. Part of the pixels of a menu frame may be transparent or partially transparent. Then, the builder 420 submits the complete menu frame to a section of the BOFM 430 so that it is assigned to the relevant one of the video output modules 196.

The BOFM 430 may be a memory having a plurality of sections. Each section includes video data of a menu frame. Each section is temporarily assigned to one of the output modules 196 (FIG. 1a) that is assigned to the endpoints 110a-n (FIG. 1a) for which the menu is being prepared.

The Common Interface Adaptor (CIA) 440 acts as the interface between the common interface 198 (FIG. 1a) of the video module 194 (FIG. 1a) and the MG 192. The implementation of the CIA 440 is based the common interface 198 type. For example, if the common interface 198 is a TDM bus, then the CIA 440 divides the frame memory (which it grabbed and/or received from the BOFM 430) into time slots and submits them to the common interface in the appropriate time slots that have been allocated to the MG 192. If the common interface is a shared memory, then the CIA 440 may be a buffer or collection of buffers.

The controller 450 controls the operation of the exemplary MG 192. During the conference setup, the controller 450 receives, from the control module 170, the parameters of the conference. The parameters may include information such as, but not limited to, which of the output modules 196 (FIG. 1a) are associated with the endpoints 110a-n (FIG. 1a) that are involved in the conference, the frame resolution of each of the endpoints 110a-n participating in the conference, the type of menus for each of the endpoints 110a-n that are participating, and the data to generate these menus. The controller 450 submits this data to the appropriate logic modules of the MG 192. Then, the controller allocates the BOFM 430 between the appropriate video output modules 196, and instructs the CIA 440 and the builder 420 about this allocation.

After the setting process, the controller 450 instructs the various modules to generate the menu tab and to transfer the menu tab to the appropriate one of the output modules 196. Then, the controller 450 waits for the next change in the menu.

The MG 192 may have other logic modules. For example, some embodiments may not have the BOFM 410. In such a case, the builder 420 builds the appropriate menu by collecting the data from the CG 413, the text generator 416, and the BOGO 418. In another embodiment, the MG 192 may include the BOFM 410, the CG 413, and the text generator 416, but not the BOGO 418. Furthermore, if in an embodiment the MG 192 is distributed between each of the output modules 196 (FIG. 1a), then the MG 192 may not use the BOFM 410 or the CIA 440.

In an alternative embodiment, the MG 192 may be located in the output modules 196 and may include a bank of menus. The menus, in this case, may have been prepared during the conference setup to match the profiles of the endpoints 110a-n (e.g., to have the same resolution), which are assigned to the output modules 196. This bank of menus includes all the possible menus and submenus with all the possible locations of the cursor that may be used during the conference. Upon receiving instructions from the user during the conference, the control module 170 instructs the video output modules 196 to select the appropriate menu from this preprepared bank of menus 410. The selected menu is then composed with the next frame memory.

Figure 5:
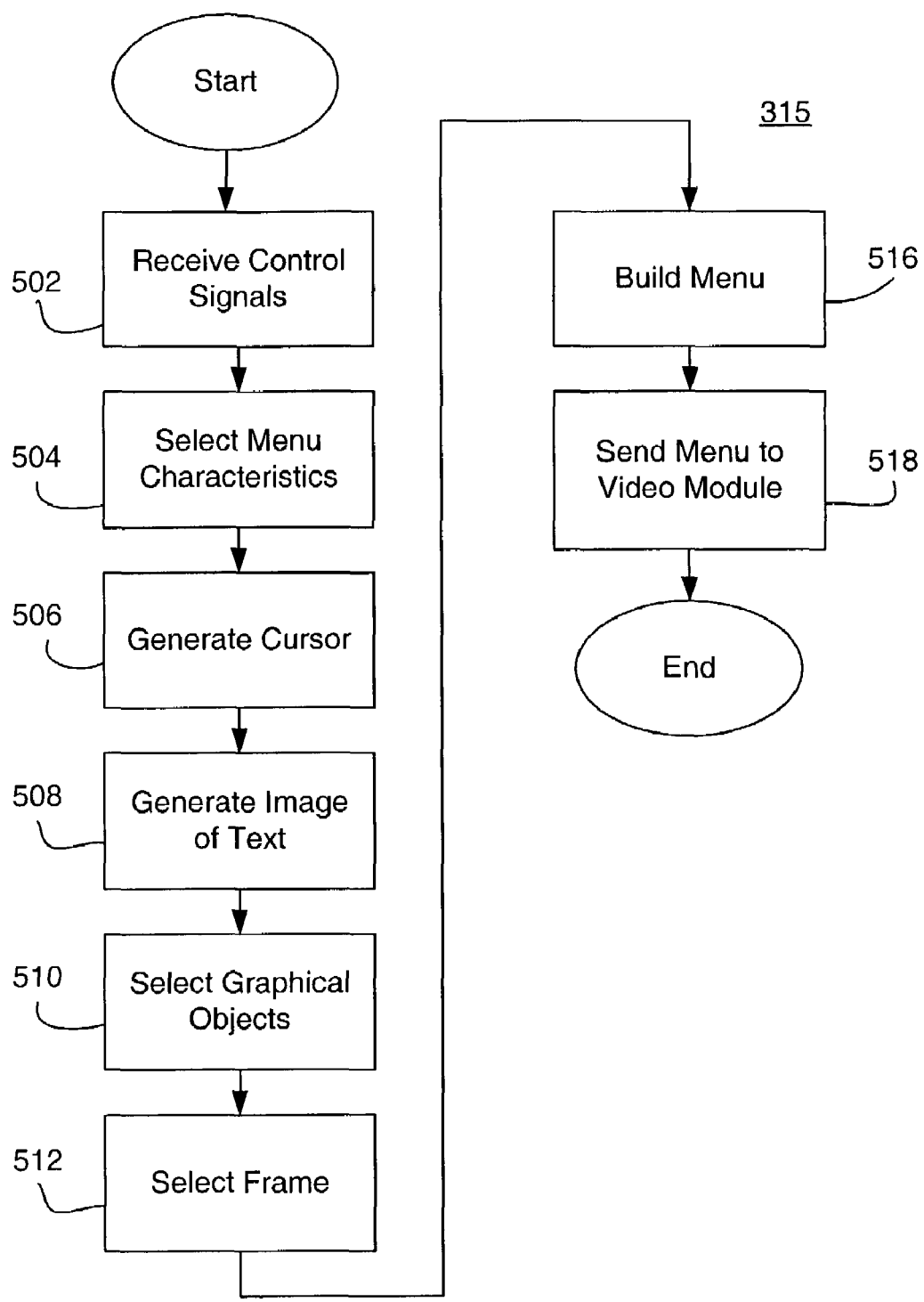
FIG. 5 is a flowchart showing the operation of the exemplary MG.

FIG. 5 is an exemplary flowchart for a method 500 of operation of the MG 192. Method 500 is a general method for generating a plurality of menus, which may also be used to implement step 315 (FIG. 3). In step 502, the controller 450 (FIG. 4) receives control signals via the control line 180 from the control module 170. In turn, the controller 450 generates control signals for the bank of menus 410, the cursor generator 413, the text generator 416, the Bank Of Graphic Objects (BOGO) 418, the builder 420, the bank of frame memories 430, and/or the CIA 440 (FIG. 4). Based on these control signals, aspects of the menu or menu characteristics are selected from the bank of menus 410 in step 504. Further, a cursor and its position are generated using cursor generator 413 in step 506. Subsequently, text is converted into graphical images of the corresponding letters (e.g., a bit map of the letter may be generated) using text generator 416 in step 508. In step 510, graphical objects (within which text may be placed) are selected, and a frame is selected from the bank of frames in step 512. In step 516, the builder 420 uses the menu characteristics that were selected, the cursor that was generated, and the graphical images that were selected to build a menu and the menu is added to the selected frame. The menu and the selected frame are then sent to the video module 194 in step 518. The CIA 440 may place the frame having the menu in a format and location that is expected by video module 194. Steps 504, 506, 508, 510, and 512 may be independent processes that may be performed simultaneously or in any order with respect to one another.

In the description and claims of the present application, each of the words, "comprise," "include," "have," "with," and conjugations of these words are used to indicate that the (object or) objects following these words are not necessarily a complete list of the members, components, elements, actions, and/or parts of the subject (or subjects) of these words.

In the above description, when transferring signals, streams, or information between two components, the signals, streams, or information are often said to be "sent," "transferred," or "forwarded" from the first component to the second component. Similarly, the signals, streams, or information are often said to be "grabbed" or "received" by the second component from the first component. All of these expressions may be interchanged one for another anywhere in the specification unless expressly indicated otherwise. Although some of these expressions describe different physical processes, these processes are interchangeable within this specification.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of ordinary skill in the art. The scope of the invention is limited only by the following claims.

What is claimed:

1. A method for controlling a video communication session whereby any of a plurality of users each using an endpoint can control a video control unit, each of the endpoints providing live video data to the video control unit, the method comprising:

transmitting from the video control unit to a given user's endpoint a video signal, wherein the video signal comprises a composite of the live video data from at least one of the plurality of endpoints and further comprises at least one representation of a control option;

inputting the given user's request at the endpoint in response to the control option;

sending a control signal carrying the request from the given user's endpoint to the video control unit; and responding to the control signal at the video control unit by changing parameters of the video communication session.

2. The method of claim 1, wherein the video control unit is a multipoint control unit.

3. The method of claim 1, wherein the video control unit is a media gateway.

4. The method to claim 1, wherein the sending supports sending a Dual Tone Multi-Frequency signal.

5. The method of claim 1, wherein the sending supports sending a far end camera control signal.

6. The method of claim 1, wherein the sending supports sending the user's vocal signal.

7. The method of claim 1, wherein the sending supports sending a proprietary control signal.

8. The method of claim 1, wherein the representation of the option includes at least text data.

9. The method of claim 1, wherein the representation of the option includes data presented as a graphical shape.

10. The method of claim 1, wherein the representation of the option includes data presented as text within a graphical shape.

11. The method of claim 1, wherein responding further comprises generating a menu and transmitting that menu to the given user by at least selecting menu characteristics from a bank of menu characteristics;

generating text images corresponding to text;

selecting graphic objects, to be used in the menu, from a bank of graphic objects; and composing the menu by building the menu from the menu characteristics, the text image, and the graphic objects, and transmitting the menu to the given user as a composite with the live video data from at least one of the plurality of endpoints.

12. The method of claim 1, further comprising generating a menu including text images and graphic objects.

13. The method of claim 1, wherein the control option comprises a menu selection, and wherein the responding comprises:

if the menu selection indicates a cursor movement, moving the cursor in a selected direction, and then providing another menu selection;

if the menu selection indicates an exit of a menu, closing the menu; and if the menu selection indicates a selection of a routine, selecting the routine.

14. The method of claim 1, wherein the parameters of the video communication session include at least one parameter selected from a group consisting of a layout of the video communication session, a quality, a region of interest, and a visual effect.

15. The method of claim 1, wherein responding to the control signal includes at least one action selected from a group consisting of displaying a certain user, changing a volume, adding a user, removing a user, and altering the duration of the communication session.

16. A system comprising a control module configured to change parameters of a video communication session based on control signals from an endpoint of a video communication session user without assistance from an operator, the system comprising:

at least one menu generator configured to generate video data for at least one menu having at least one option selectable by the user; and a video module configured to incorporate into a video signal a composite of live video data from at least one of the plurality of endpoints and the video data for the menu, and to transmit the video signal to an endpoint.

17. The system of claim 16, wherein the video module is part of a Multipoint Control Unit.

18. The system of claim 16, wherein the video module is part of a media gateway.

19. The system of claim 16, wherein the parameters can be changed by the user while the conference is ongoing.

20. The system of claim 16, wherein the control signals comprise at least one of the signal selected from the group consisting of a Dual Tone Multi-Frequency signals and a far end camera control signal.

21. The system of claim 16, wherein the parameters of the video communication system include at least one parameter selected from a group consisting of a layout of the video communication system, a quality, a region of interest, and a visual effect.

22. The system of claim 16, wherein the parameters of the video communication system include at least one parameter selected from a group consisting of a speaker output, a volume level, an added user, a removed user, and a duration of the communication session.

23. The system of claim 16, wherein the menu includes at least text data.

24. The system of claim 16, wherein the menu includes at least a graphical image.

25. The system of claim 16, wherein the menu generator comprises:

a text generator for adding text to images;

a bank of graphic objects for storing at least one graphic object used by the menu;

a builder for building the menu using the text from the text generator and the at least one graphic object from the bank of graphic objects; and a controller for sending control signals to the text generator, the bank of graphic objects and the builder to form the menu.

26. The system of claim 16, wherein the video signal is capable of forming an image on a screen at the end point indicative of the menu and the live video data.

27. The system of claim 16, further comprising:

the endpoint; and a network communicatively connecting the endpoint to the control module.

28. The system of claim 16, further comprising an audio unit for processing an audio stream from an endpoint, the audio unit recognizing at least a Dual Tone Multi-Frequency.

29. The system of claim 16, wherein the video module further comprises:

one or more input modules for receiving the live video data from one or more endpoints; and a common interface communicatively connected to the one or more input modules.

30. The system of claim 29, wherein the video module further comprises one or more output modules that receive signals from the common interface associated with the one or more input modules and the at least one menu generator;

compose the signals from the common interface into one composed video image; and compress the composed video image to formulate the video signal.

31. A computer readable medium having stored thereon instructions for a method for controlling a video control unit at an endpoint, the method comprising:
- transmitting from the video control unit to a given user's endpoint a video signal, wherein the video signal comprises a composite of the live video data from at least one of the plurality of endpoints and further comprises at least one representation of a control option;
- inputting the given user's request at the endpoint in response to the control option;
- receiving at the video control unit a control signal from the endpoint in response to the control option; and
- responding to the control signal at the video control unit by changing parameters of the video communication session.

32. A method for interfacing between a plurality of endpoints and a video control unit in a video communication session, comprising:
- generating at the video conferencing unit a video signal comprising a composite of live video data from at least one of the plurality of endpoints and video data indicative of at least one representation of a control option;
- transmitting the video signal to the plurality of endpoints; and
- displaying the at least one option at the plurality of end point to in a manner that is selectable by the users of the endpoints.

* * * * *